United States Patent
Larkins (10) Patent No.: US 11,871,704 B2
(45) Date of Patent: Jan. 16, 2024

(54) BRACKET ASSEMBLIES OF VEGETATION HANGING AND DRYING SYSTEMS

(71) Applicant: DriFlower, LLC, Ashland, OR (US)

(72) Inventor: Todd Chandler Larkins, Ashland, OR (US)

(73) Assignee: DRIFLOWER, LLC, Ashland, OR (US)

( * ) Notice: Subject to any disclaimer, the term of this patent is extended or adjusted under 35 U.S.C. 154(b) by 0 days.

(21) Appl. No.: 17/724,835

(22) Filed: Apr. 20, 2022

(65) Prior Publication Data

US 2023/0337587 A1   Oct. 26, 2023

(51) Int. Cl.
*A01F 25/12*   (2006.01)
*F16M 11/00*   (2006.01)

(52) U.S. Cl.
CPC ............ *A01F 25/12* (2013.01); *F16M 11/00* (2013.01); *F16B 2200/67* (2023.08)

(58) Field of Classification Search
CPC ........ A01F 25/12; F16M 11/00; Y10T 403/73
USPC ............. 248/121, 201, 202.1, 205.4, 220.21, 248/229.2; 34/239; 211/85.3, 85.4
See application file for complete search history.

(56) References Cited

U.S. PATENT DOCUMENTS

| | | |
|---|---|---|
| 941,448 A | 11/1909 | Haglund |
| 945,729 A | 1/1910 | Rangnow |
| 1,321,997 A | 11/1919 | Duberstein |
| 1,515,078 A | 11/1924 | Sheee |
| 1,833,388 A | 11/1931 | Carmack |
| 1,868,638 A | 7/1932 | Mackey |
| 2,099,596 A | 11/1937 | Bruening |
| 2,150,869 A | 3/1939 | Shafarman |
| 2,279,777 A | 4/1942 | Dean |
| 2,289,729 A | 7/1942 | Robinson et al. |
| 2,411,856 A | 12/1946 | Harding |
| 2,484,449 A | 10/1949 | Fetterman |
| 2,546,929 A | 3/1951 | Nampa |
| 2,580,193 A | 12/1951 | Richterkessing |
| 2,586,913 A | 2/1952 | Burns |
| 2,634,031 A | 4/1953 | Klein |
| 2,671,938 A | 3/1954 | Roberts |
| 2,692,711 A | 10/1954 | Norris et al. |

(Continued)

FOREIGN PATENT DOCUMENTS

| | | |
|---|---|---|
| CA | 2458956 A1 | 9/2004 |
| CN | 105474854 A | 4/2016 |

(Continued)

OTHER PUBLICATIONS

Chrystal Johnson: 11 How to dry herbs from your Garden, Happy Mothering natural living in a modern world Aug. 29, 2017 (Aug. 29, 2017), Retrieved from the Internet: URL:https://www.happy-mothering.com/diy-ha nging-herb-dryer/.

(Continued)

*Primary Examiner* — Muhammad Ijaz
(74) *Attorney, Agent, or Firm* — George Likourezos; Carter, DeLuca & Farrell LLP (57) ABSTRACT

A multi-rack bracket assembly of a vegetation and drying system includes a first bracket and a second bracket configured to capture and secure a leg assembly of a stand therebetween. The first and second brackets are configured to secure a horizontal support bar and the leg assembly to one another.

20 Claims, 5 Drawing Sheets

(56) References Cited

U.S. PATENT DOCUMENTS

| | | |
|---|---|---|
| 2,716,513 A | 8/1955 | Braunstein |
| 2,828,897 A | 4/1958 | Gordon |
| 3,131,817 A | 5/1964 | Schenkler |
| 3,194,458 A | 7/1965 | Bennett |
| D202,954 S | 11/1965 | Hanson |
| 3,346,150 A | 10/1967 | Clopton |
| D210,333 S | 2/1968 | Apy |
| 3,535,808 A | 10/1970 | Morrish |
| 3,606,948 A | 9/1971 | Strang |
| 3,874,572 A | 4/1975 | McClenning |
| D236,572 S | 9/1975 | Ostroll |
| D264,912 S | 6/1982 | Bliss et al. |
| 4,440,369 A | 4/1984 | Banks |
| 4,703,878 A | 11/1987 | Louw |
| 4,717,053 A | 1/1988 | Wang |
| 4,724,967 A | 2/1988 | Valiulis |
| 4,793,531 A | 12/1988 | Blanchard et al. |
| 4,845,602 A | 7/1989 | Lehocki |
| 4,881,342 A | 11/1989 | Ferguson |
| 5,007,562 A | 4/1991 | Brink et al. |
| 5,074,445 A | 12/1991 | Chen |
| D331,425 S | 12/1992 | Rhyne |
| D332,180 S | 1/1993 | Marshall et al. |
| 5,329,728 A | 7/1994 | Ray |
| 5,333,409 A | 8/1994 | Mendes |
| 5,361,949 A | 11/1994 | Petrou |
| 5,388,354 A | 2/1995 | Marshall et al. |
| D357,813 S | 5/1995 | Koresko |
| 5,520,311 A | 5/1996 | Lam |
| 5,535,927 A | 7/1996 | Garrison |
| 5,544,765 A | 8/1996 | Farbman |
| 5,581,936 A | 12/1996 | Belgiorno |
| 5,813,092 A | 9/1998 | Greenfield et al. |
| 5,826,759 A | 10/1998 | Ohsugi |
| 5,884,422 A | 3/1999 | Marshall et al. |
| 6,047,867 A | 4/2000 | Heiber |
| 6,132,305 A | 10/2000 | Witherell |
| 6,298,600 B1 | 10/2001 | Feldman |
| 6,340,238 B1 | 1/2002 | Pan |
| 6,349,863 B1 | 2/2002 | Frye |
| 6,389,744 B1 | 5/2002 | Pugh |
| 6,641,105 B1 | 11/2003 | Hamerski |
| 6,659,295 B1 | 12/2003 | De Land et al. |
| 6,811,064 B2 | 11/2004 | Salem |
| 6,817,497 B2 | 11/2004 | Grasso et al. |
| D502,756 S | 3/2005 | Birdwell et al. |
| 6,863,197 B1 | 3/2005 | Dirlam et al. |
| 7,015,815 B1 | 3/2006 | Feibelman |
| 7,178,705 B1 | 2/2007 | Sutton |
| 7,377,409 B1 | 5/2008 | Brown |
| 7,774,977 B2 | 8/2010 | Miller Shelton |
| 7,984,585 B1 | 7/2011 | Wu |
| 8,276,714 B2 | 10/2012 | Broyles |
| D711,123 S | 8/2014 | Birge |
| 9,113,736 B1 | 8/2015 | Antler |
| D772,584 S | 11/2016 | Debus |
| 9,782,031 B2 | 10/2017 | Debus |
| D806,410 S | 1/2018 | Denby et al. |
| D853,737 S | 7/2019 | Wolfe |
| D867,770 S | 11/2019 | Wright |
| 2002/0184799 A1 | 12/2002 | Chou |
| 2004/0226971 A1 | 11/2004 | Detten |
| 2005/0035159 A1 | 2/2005 | Hunt et al. |
| 2005/0139625 A1 | 6/2005 | Gouldson |
| 2005/0189383 A1 | 9/2005 | Weal et al. |
| 2006/0032130 A1 | 2/2006 | Liffers et al. |
| 2006/0226179 A1 | 10/2006 | Hsu |
| 2007/0266627 A1 | 11/2007 | Shelton |
| 2008/0236041 A1 | 10/2008 | Carpenter |
| 2008/0283558 A1 | 11/2008 | Rude et al. |
| 2011/0247185 A1 | 10/2011 | Bolden et al. |
| 2011/0284597 A1 | 11/2011 | Kaleta et al. |
| 2012/0132679 A1 | 5/2012 | Gouldson |
| 2013/0015215 A1 | 1/2013 | Coote |
| 2013/0221041 A1 | 8/2013 | Wittenstein et al. |
| 2014/0101963 A1* | 4/2014 | Larabie ............. D06F 57/12 34/239 |
| 2014/0246464 A1 | 9/2014 | Zhong |
| 2014/0360043 A1* | 12/2014 | Baek ............. D06F 58/00 34/239 |
| 2014/0367425 A1 | 12/2014 | Laibe |
| 2016/0058210 A1 | 3/2016 | Strassburger et al. |
| 2016/0223137 A1 | 8/2016 | Ochipa |
| 2017/0105362 A1 | 4/2017 | Irving, Jr. |
| 2017/0238731 A1 | 8/2017 | Davies |
| 2017/0325614 A1 | 11/2017 | Baltz |
| 2018/0087293 A1 | 3/2018 | Strassburger et al. |
| 2018/0103785 A1 | 4/2018 | Goldman et al. |
| 2018/0160833 A1 | 6/2018 | Ho |
| 2018/0303263 A1 | 10/2018 | Jones et al. |
| 2018/0317685 A1 | 11/2018 | Boles |
| 2018/0325299 A1 | 11/2018 | Clark et al. |
| 2018/0356028 A1 | 12/2018 | Fang |
| 2019/0014936 A1 | 1/2019 | Beyda et al. |
| 2019/0234556 A1* | 8/2019 | Hoyle ............. F16M 11/16 |
| 2019/0307264 A1 | 10/2019 | Carr et al. |
| 2019/0380522 A1 | 12/2019 | Johansson |
| 2020/0085221 A1 | 3/2020 | Riedel et al. |
| 2020/0128988 A1 | 4/2020 | Moore et al. |
| 2020/0245796 A1 | 8/2020 | Gilbert |
| 2022/0279928 A1* | 9/2022 | Larkins ............. A01F 25/12 |
| 2022/0312965 A1* | 10/2022 | Larkins ............. A47B 96/068 |
| 2023/0151534 A1* | 5/2023 | Tarasova ............. D06F 57/08 211/85.3 |

FOREIGN PATENT DOCUMENTS

| | | |
|---|---|---|
| CN | 206611910 U | 11/2017 |
| CN | 107896731 A | 4/2018 |
| DE | 3246174 C2 | 1/1994 |
| FR | 2464638 A1 | 3/1981 |
| FR | 3062120 A1 | 7/2018 |
| JP | 2008092939 A | 4/2008 |
| JP | 4218802 B2 | 2/2009 |
| JP | 4399093 B2 | 1/2010 |
| JP | 2011010890 A | 1/2011 |
| KR | 20-2005-0002675 A | 1/2005 |
| KR | 2003821320000 Y1 | 4/2005 |
| KR | 2011 0029352 A | 3/2011 |
| KR | 101071670 B1 | 10/2011 |
| KR | 2012 0131010 A | 12/2012 |
| KR | 2017 0067056 A | 6/2017 |
| KR | 20170079314 A | 7/2017 |
| KR | 101938225 B1 | 1/2019 |
| WO | 2018150157 A1 | 8/2018 |

OTHER PUBLICATIONS

International Search Report and Written Opinion for Application No. PCT/US2020/042261 dated Nov. 2, 2020.

International Search Report and Written Opinion issued in corresponding International Application No. PCT/US2020/053426 dated Jan. 18, 2021, 14 pages.

International Search Report and Written Opinion issued in corresponding International Application No. PCT/US2020/054898 dated Jan. 22, 2021, 14 pages.

International Preliminary Report on Patentability issued in corresponding international application No. PCT/US2020/053426, 6 pages.

* cited by examiner

BRACKET ASSEMBLIES OF VEGETATION HANGING AND DRYING SYSTEMS

BACKGROUND

Recently there has been a widespread growth of the use of *Cannabis* and hemp ranging from medicinal to recreational. In this widespread growth, the drying of *Cannabis* and hemp has become an essential part of the processing of *Cannabis* and hemp, but the process takes a significant amount of time and effort. Typically, the drying process requires the hemp and/or *Cannabis* to be hung with plastic netting, which is not only time-consuming but requires a lot of manual labor and leaves little room for error.

The plastic netting process requires the hemp and/or *Cannabis* to be hung one branch at time and threaded through the netting to secure the hemp and/or *Cannabis*. Removal of the hemp and/or *Cannabis* requires careful unthreading of the hemp and/or *Cannabis* from the plastic netting. Additionally, from harvest to drying there are multiple contacts with the hemp and/or *Cannabis* that diminish the quality of the finished dried product. Therefore, there is a need to provide a system of hanging and drying vegetation, such as, hemp, *Cannabis*, and other plants harvested and subsequently dried, without damaging the vegetation.

SUMMARY

In one aspect, the present disclosure provides a multi-rack bracket assembly for use in a vegetation hanging and drying system. The multi-rack bracket assembly includes a first bracket and a second bracket. The first bracket includes a first main plate having an upper end portion defining at least one slot therethrough configured for receipt of at least one horizontal support bar. The first main plate has a first lateral edge, and an opposite second lateral edge extending at an acute angle relative to the first lateral edge. The second bracket includes a second main plate having a first lateral edge, and an opposite second lateral edge extending at an acute angle relative to the first lateral edge. The first and second lateral edges of the first main plate correspond to the first and second lateral edges of the second main plate, wherein the first main plate and the second main plate are configured to capture a pair of vertical support legs therebetween.

In aspects, the first bracket may include an upper plate extending outwardly from the upper end portion of the first main plate, and a first support flange extending upwardly from the upper plate and configured to engage a first side of a vertical support bar.

In aspects, the second bracket may include an upper plate extending outwardly from an upper end portion of the second main plate. The upper plate of the first bracket and the upper plate of the second bracket may be configured to overlap one another to capture the at least one horizontal support bar therebetween.

In aspects, the second bracket may include a second support flange extending upwardly from the upper plate of the second bracket. The second support flange may be configured to engage a second side of the vertical support bar.

In aspects, the upper plate of the first bracket may define an opening therethrough configured for receipt of the second support flange of the second bracket and the vertical support bar.

In aspects, the upper plate of the second bracket may define an opening therethrough configured to receive the vertical support bar. The second bracket may include a ledge extending outwardly from the second main plate and defining a hole configured to laterally support an end portion of the vertical support bar.

In aspects, the slot may be a first slot and a second slot extending in parallel relation to one another. The first and second slots may be configured to receive respective first and second horizontal support bars.

In aspects, the first bracket may further include a pair of tabs extending from the upper end portion of the first main plate in a direction away from the upper plate of the first bracket.

In aspects, each of the pair of tabs may have a hole therethrough configured to receive a fastener. The upper plate may have a pair of holes aligned with the respective pair of holes in the pair of tabs. Each of the pair of holes of the upper plate may be configured to receive a fastener.

In aspects, each of the first and second main plates may have a generally trapezoidal shape.

In aspects, the first bracket may include an upper flange extending outwardly from the upper end portion of the first main plate, and the second bracket may include an upper flange extending outwardly from an upper end portion of the second main plate. The upper flanges may extend in opposite directions from one another. The upper end portion of the second main plate may define a slot therethrough configured to be aligned with the slot of the first main plate.

In accordance with another aspect of the disclosure, a multi-rack bracket assembly for use in a vegetation hanging and drying system is provided. The multi-rack bracket assembly includes a first bracket and a second bracket. The first bracket includes a first main plate, an upper plate extending outwardly from an upper end portion of the first main plate, and a first support flange extending upwardly from the upper plate. The first main plate includes an upper end portion defining a first slot configured for receipt of a first horizontal support bar. The first support flange is configured to engage a first side of a vertical support bar. The second bracket includes a second main plate, an upper plate extending outwardly from the an upper end portion of the second main plate, and a second support flange extending upwardly from the upper plate of the second bracket. The first and second main plates are configured to capture a leg assembly therebetween. The upper plate of the first bracket and the upper plate of the second bracket are configured to overlap one another to capture the first horizontal support bar therebetween. The second support flange is configured to engage a second side of the vertical support bar to capture the vertical support bar between the first and second support flanges.

In aspects, the upper plate of the first bracket may define an opening therethrough configured for receipt of the second support flange of the second bracket and the vertical support bar.

In aspects, the upper plate of the second bracket may define an opening therethrough configured to receive the vertical support bar, and the second bracket may include a ledge extending outwardly from the second main plate and defining a hole configured to laterally support an end portion of the vertical support bar.

In aspects, the first bracket may further include a pair of tabs extending from the upper end portion of the first main plate in a direction away from the upper plate of the first bracket. The upper end portion of the first main plate may define a second slot extending in parallel relation to the first slot. The second slot may be configured to receive a second horizontal support bar.

In accordance with an aspect of the disclosure, a vegetation hanging and drying system is provided that includes a harvest stand and first and second brackets. The harvest stand includes first and second leg assemblies, a first horizontal support bar configured to extend between and interconnect the first and second leg assemblies, and first and second vertical support bars configured to extend upwardly from the respective first and second leg assemblies. The first bracket is configured to secure the first leg assembly, the first vertical support bar, and a first end portion of the first horizontal support bar to one another. The first bracket includes a first main plate and an upper plate extending outwardly from an upper end portion of the first main plate. The upper end portion defines a first slot configured for receipt of the first horizontal support bar. The second bracket is configured to secure the second leg assembly, the second vertical support shaft, and a second end portion of the horizontal support bar to one another. The second bracket includes a second main plate and an upper plate extending outwardly from an upper end portion of the second main plate. The first and second main plates are configured to capture the first leg assembly therebetween. The upper plate of the first bracket and the upper plate of the second bracket are configured to overlap one another to capture the first horizontal support bar therebetween.

In aspects, the first bracket may include a first support flange extending upwardly from the upper plate thereof. The first support flange may be configured to engage a first side of the first vertical support bar. The second bracket may include a second support flange extending upwardly from the upper plate thereof. The second support flange may be configured to engage a second side of the first vertical support bar.

In aspects, the upper plate of the first bracket may define an opening therethrough configured for receipt of the second support flange of the second bracket and the first vertical support bar.

In aspects, the upper plate of the second bracket may define an opening therethrough configured to receive the first vertical support bar. The second bracket may include a ledge extending outwardly from the second main plate. The ledge may define a hole configured to laterally support an end portion of the first vertical support bar.

In aspects, the upper end portion of the first main plate may define a second slot extending in parallel relation to the first slot. The second slot may be configured to receive a second horizontal support bar. The first and second horizontal support bars may be configured to couple the first and second leg assemblies to one another. The second support flange may be configured to extend between the first and second horizontal support bars.

The details of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

Aspects of the presently disclosed vegetation hanging and drying systems and multi-rack bracket assemblies thereof are described in detail with reference to the drawings, in which like reference numerals designate identical or corresponding elements in each of the several views.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "top" and "bottom" are relative and used only in the context to the other, and are not necessarily "superior" and "inferior."

As used herein, the terms parallel and perpendicular are understood to include relative configurations that are substantially parallel and substantially perpendicular up to about + or −15 degrees from true parallel and true perpendicular.

Figure 1:
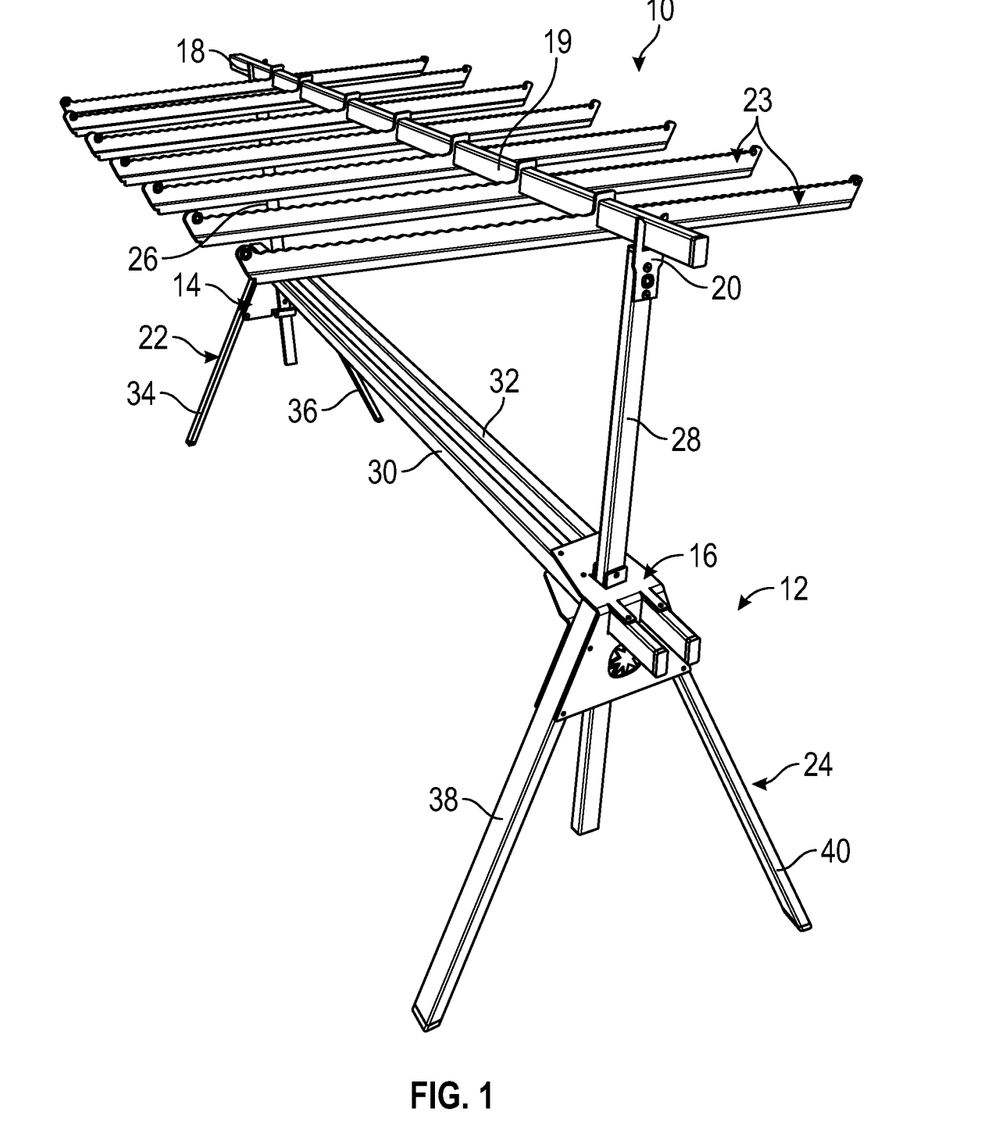
FIG. 1 is a front view illustrating a vegetation hanging and drying system including a pair of leg assemblies, a pair of vertical support bars, and a pair of horizontal support bars assembled to one another with a pair of multi-rack bracket assemblies, and a plurality of vegetation hangers supported on a separate horizontal support bar.

With reference to FIG. 1, the present disclosure is directed to a vegetation hanging and drying system 10 for suspending vegetation, and most suitably *Cannabis*, to allow the vegetation to dry after harvesting. The vegetation hanging and drying system 10 generally includes a stand 12, a pair of multi-rack bracket assemblies 14, 16 for assembling the components of the stand 12 together, and a pair of hanging bar brackets 18, 20 secured to opposite lateral sides of the stand 12 and configured to support a horizontal support bar 19, which allows for the hanging of vegetation hangers, such as, for example, pro hangers 23 thereon. The vegetation hangers 23 support the vegetation (e.g., *Cannabis*) thereon to allow the vegetation to dry prior to harvesting.

The stand 12 of the vegetation hanging and drying system 10 includes first and second leg assemblies 22, 24, first and second vertical support shafts 26, 28 extending upwardly from the respective first and second leg assemblies 22, 24, and first and second horizontal support bars 30, 32 (FIG. 2) that couple, in a spaced-apart state, the first and second leg assemblies 22, 24 to one another. It is contemplated that the stand 12 may be provided as a kit where the end user assembles the various components to one another to build the stand 12. In other aspects, the stand 12 may be provided to the consumer preassembled.

Each of the first and second leg assemblies 22, 24 of the stand 12 includes first and second elongate elements 34, 36 and 38, 40 (e.g., dimensional lumber or steel, rectangular bars) configured to be angled relative to one another (e.g., from about 45 to about 90 degrees). The first and second elongate elements 34, 36 of the first leg assembly 22 are configured to be fixed relative to one another and to the first vertical support bar 26 using the first multi-rack bracket assembly 14, and the first and second elongate elements 38, 40 of the second leg assembly 24 are configured to be fixed relative to one another and to the second vertical support bar 28 using the second multi-rack bracket assembly 16, as will be described in further detail below. Since the multi-rack bracket assemblies 14, 16 are identical or substantially similar, only the first multi-rack bracket assembly 14 will be described in detail.

Figure 2:
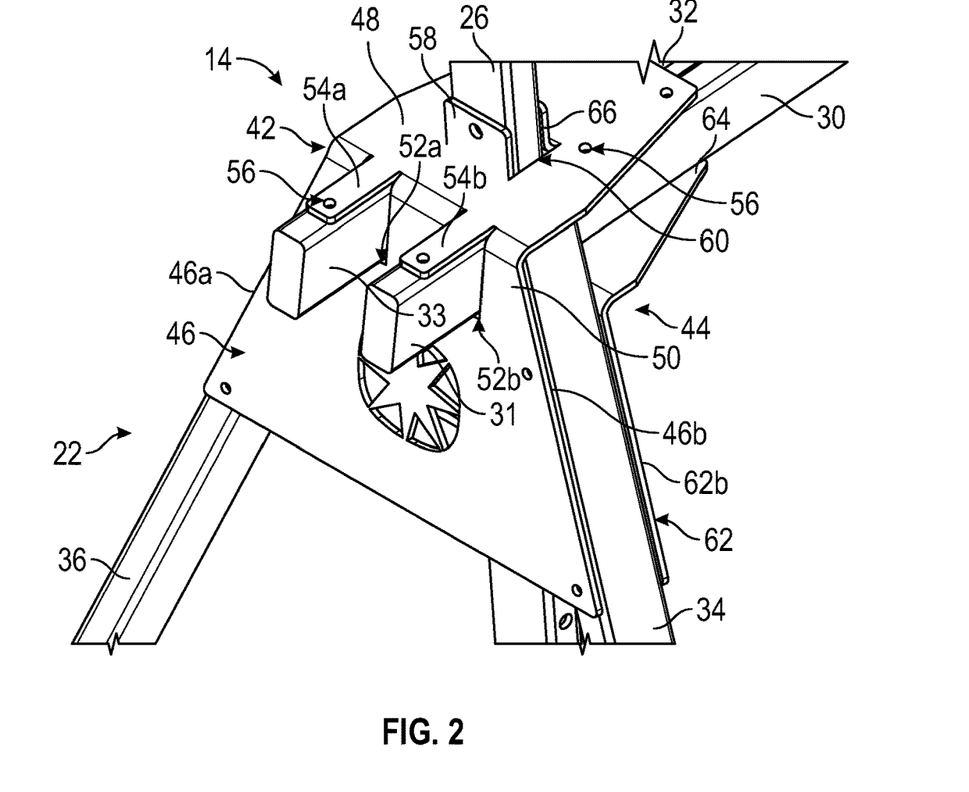
FIG. 2 is a perspective view illustrating first and second brackets of the multi-rack bracket assembly of FIG. 1 securing one of the leg assemblies, one of the vertical support bars, and the pair of horizontal support bars to one another.
Figure 3:
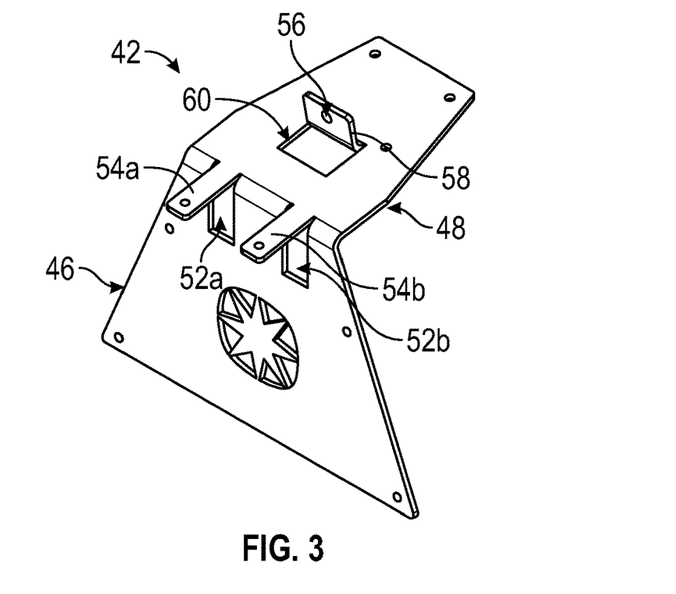
FIG. 3 is a perspective view illustrating the first bracket of the multi-rack bracket assembly of FIG. 2.
Figure 4:
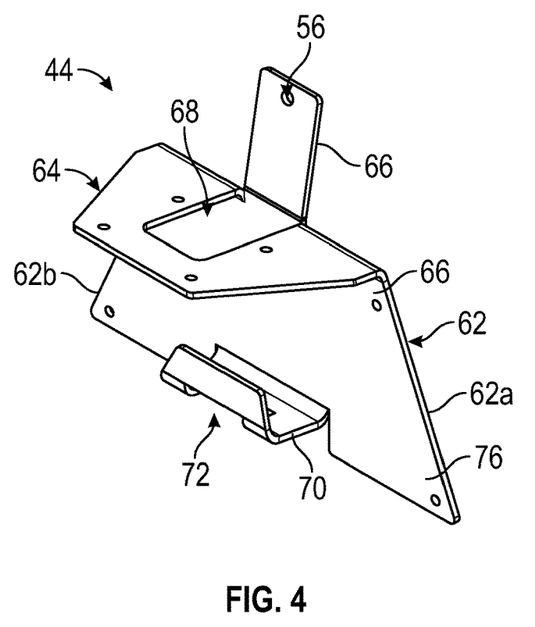
FIG. 4 is a perspective view illustrating the second bracket of the multi-rack bracket assembly of FIG. 2
Figure 5:
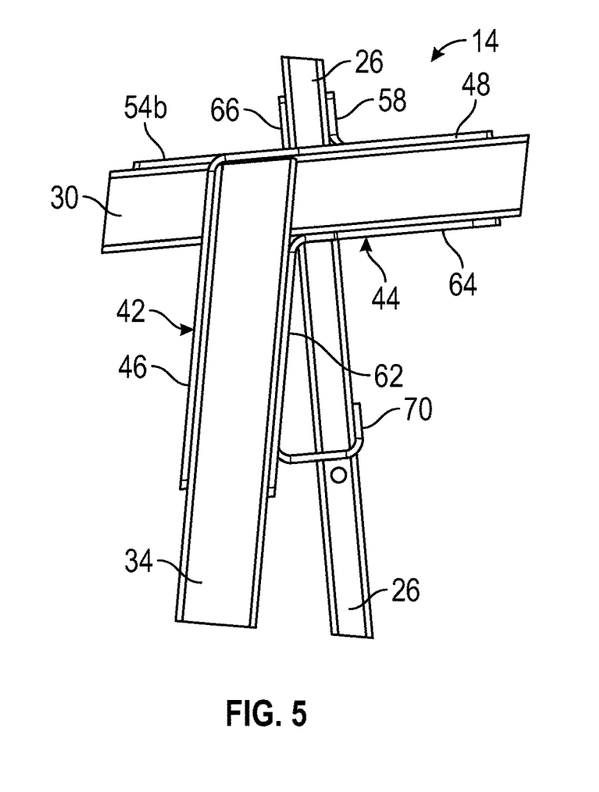
FIG. 5 is a side view illustrating the multi-rack bracket assembly of FIG. 2 assembled to one of the leg assemblies, one of the vertical support bars, and the pair of horizontal support bars.

With reference to FIGS. 2, 3, and 5, the first multi-rack bracket assembly 14 includes a first bracket 42 (FIG. 3) and a second bracket 44 (FIG. 4) configured to couple to one another when assembled to the first leg assembly 22. In aspects, the multi-rack bracket assembly 14 may be fabricated from a lightweight metal, plastic, composite material, or any other suitable material. The first bracket 42 of the multi-rack bracket assembly 14 generally includes a first main plate 46 and an upper plate 48 extending outwardly (e.g., perpendicularly) from an upper end portion 50 of the first main plate 46.

The first main plate 46 and the upper plate 48 may be monolithically formed with one another from a single piece of sheet metal and bent relative to one another to form the first bracket 42 as shown. In other aspects, the first main plate 46 and the upper plate 48 may be attached to one another and via any suitable fastening means, such as, for example, welding, adhesive, soldering, or the like. The first main plate 46 may have a trapezoidal shape and has a first lateral edge 46a, and an opposite second lateral edge 46b extending at an acute angle (e.g., from about 30 degrees to about 80 degrees) relative to the first lateral edge 46a. Other suitable shapes for the first main plate 46 are also contemplated. In aspects, the first and second lateral edges 46a, 46b may be at any suitable angle relative to one another. The upper end portion 50 of the first main plate 46 defines first and second slots 52a, 52b therethrough configured for receipt of the respective first and second horizontal support bars 30, 32. The first and second slots 52a, 52b may extend in parallel relation to one another.

The first bracket 42 further includes a pair of tabs 54a, 54b overlapping with the respective first and second slots 52a, 52b and extending from the upper end portion 50 of the first main plate 46 in a direction away from the upper plate 48. In aspects, the first and second tabs 54a, 54b may be coplanar with the upper plate 48. Each of the pair of tabs 54a, 54b has a hole 56 therethrough configured to receive a fastener for fixing the tabs 54a, 54b to the respective first and second horizontal support bars 30, 32. The upper plate 48 has first and second holes 56 aligned with the respective pair of holes 56 in the pair of tabs 54a, 54b. The holes 56 in the upper plate 48 are configured to receive a fastener to secure the upper plate 48 to the first and second horizontal support bars 30, 32.

The first bracket 42 further includes a first support flange 58 extending upwardly from the upper plate 48 and configured to engage a first side of the first vertical support bar 26. The first support flange 58 defines a hole 56 therethrough configured for receipt of a fastener to secure the first support flange 58 to the first vertical support bar 26. The first support flange 58 is located along an axis that bisects the first and second tabs 54a, 54b. The upper plate 48 defines a recess or hole 60 therethrough dimensioned for receipt of the first vertical support bar 26. The hole 60 in the upper plate 48 is positioned adjacent the first support flange 58.

With reference to FIGS. 2, 4, and 5, the second bracket 44 of the multi-rack bracket assembly 14 includes a second main plate 62 and an upper plate 64 extending outwardly (e.g., perpendicularly) from an upper end portion 66 of the second main plate 62. The second main plate 62 and the upper plate 64 may be monolithically formed with one another from a single piece of sheet metal and bent relative to one another to form the second bracket 44 as shown. In aspects, the second main plate 62 and the upper plate 64 may be attached to one another and via any suitable fastening means, such as, for example, welding, adhesive, soldering, or the like.

The second main plate 62 may have a trapezoidal shape matching the trapezoidal shape of the first main plate 46 of the first bracket 42. Other suitable shapes for the second main plate 62 are also contemplated. The second main plate 62 has a first lateral edge 62a, and an opposite second lateral edge 62b extending at an acute angle (e.g., from about 30 degrees to about 80 degrees) relative to the first lateral edge 62a. In aspects, the first and second lateral edges 62a, 62b may be at any suitable angle relative to one another.

The second bracket 44 has a second support flange 66 extending upwardly relative to the upper plate 64 of the second bracket 44 and configured to engage a second side of the vertical support bar 26. In aspects, the second support flange 66 may be a tab that is formed from a rectangular cutout 68 in the upper plate 64 of the second bracket 44 and bent approximately 90 degrees into alignment with the second main plate 62. The second support flange 66 of the second bracket 44 is configured to engage a second side of the first vertical support bar 26 thereby capturing the first vertical support bar 26 between the first support flange 58 of the first bracket 42 and the second support flange 66 of the second bracket 44. The second support flange 66 defines a hole therethrough 56 dimensioned for receipt of a fastener (e.g., a screw, bolt, pin, etc.) to secure the second support flange 66 to the first vertical support bar 26. The cutout 68 or opening in the upper plate 64 of the second bracket 44 may be rectangular-shaped to accommodate the vertical support bar 26 therein while inhibiting lateral movement thereof.

The second bracket 44 includes a ledge 70 extending outwardly from a lower end portion 76 of the second main plate 62. The ledge 70 may have a hooked configuration and define a rectangular-shaped opening 74 therethrough dimensioned for passage of the first vertical support bar 26 while inhibiting lateral movement thereof. The opening 68 in the upper plate 64 of the second bracket 44 overlaps the opening 72 in the ledge 70 when the multi-rack bracket assembly 14 is assembled, as shown in FIG. 5.

To assemble the hanging and drying system 10 of FIG. 1, the first main plate 46 of the first bracket 42 is secured to a first side of top end portions of the first and second elongate elements 34, 36 of the first leg assembly 22 using a plurality of fasteners (e.g., screws, nuts, bolts, pins, etc.), and the second main plate 62 of the second bracket 44 is secured to an opposite second side of the top end portions of the first and second elongate elements 34, 36 of the first leg assembly 22. With the first and second brackets 42, 44 secured to the leg assembly 22 in this manner, the upper plate 48 of the first bracket 42 is spaced above and in parallel relation with the upper plate 64 of the second bracket 44, and the second support flange 66 of the second bracket 44 protrudes upwardly through the slot 60 in the upper plate 48 of the first bracket 42 to face the first support flange 58 of the first bracket 42.

The first end portion 31, 33 of the first and second horizontal support bars 30, 32 are positioned between the upper plates 48, 62 and passed through the respective first and second slots 52a, 52b of the first bracket 42 until the first end portions 31, 33 of the first and second horizontal support bars 30, 32 are underlying and in abutment with the first and second tabs 54a, 54b of the first bracket 42. Fasteners (not explicitly labeled) are used to secure the first and second horizontal bars 30, 32 to the first and second tabs 54a, 54b of the first bracket 42, the upper plate 48 of the first bracket 42, and the upper plate 64 of the second bracket 44.

The first vertical support bar 26 is positioned between the first and second support flanges 58, 66 and passed downwardly through the hole 60 in the upper plate 48 of the first bracket 42, and in turn, through a gap defined between the first and second horizontal support bars 30, 32, through the hole 68 in the upper plate 64 in the second bracket 44, and through the hole 72 in the ledge 70 of the second bracket 44. The first vertical support bar 26 may then be fastened to the first and second support flanges 58, 66. The second leg assembly 24, the second end portion of the first and second horizontal support bars 30, 32, and the second vertical support bar 28 are assembled to one another using the second multi-rack bracket assembly 16 in the same manner.

With the first and second leg assemblies 22, 24 secured to the respective first and second vertical support bars 26, 28, the hanging bar brackets 18, 20 are fastened to top end portions of the first and second vertical support bars 26, 28, respectively. Opposing ends portions of a third horizontal support bar 19 is received within the respective hanging bar brackets 18, 20 to position the horizontal support bar 19 directly above the first and second vertical support bars 26, 28. Vegetation hangers 23 may be hung from the third horizontal support bar 19.

Figure 6:
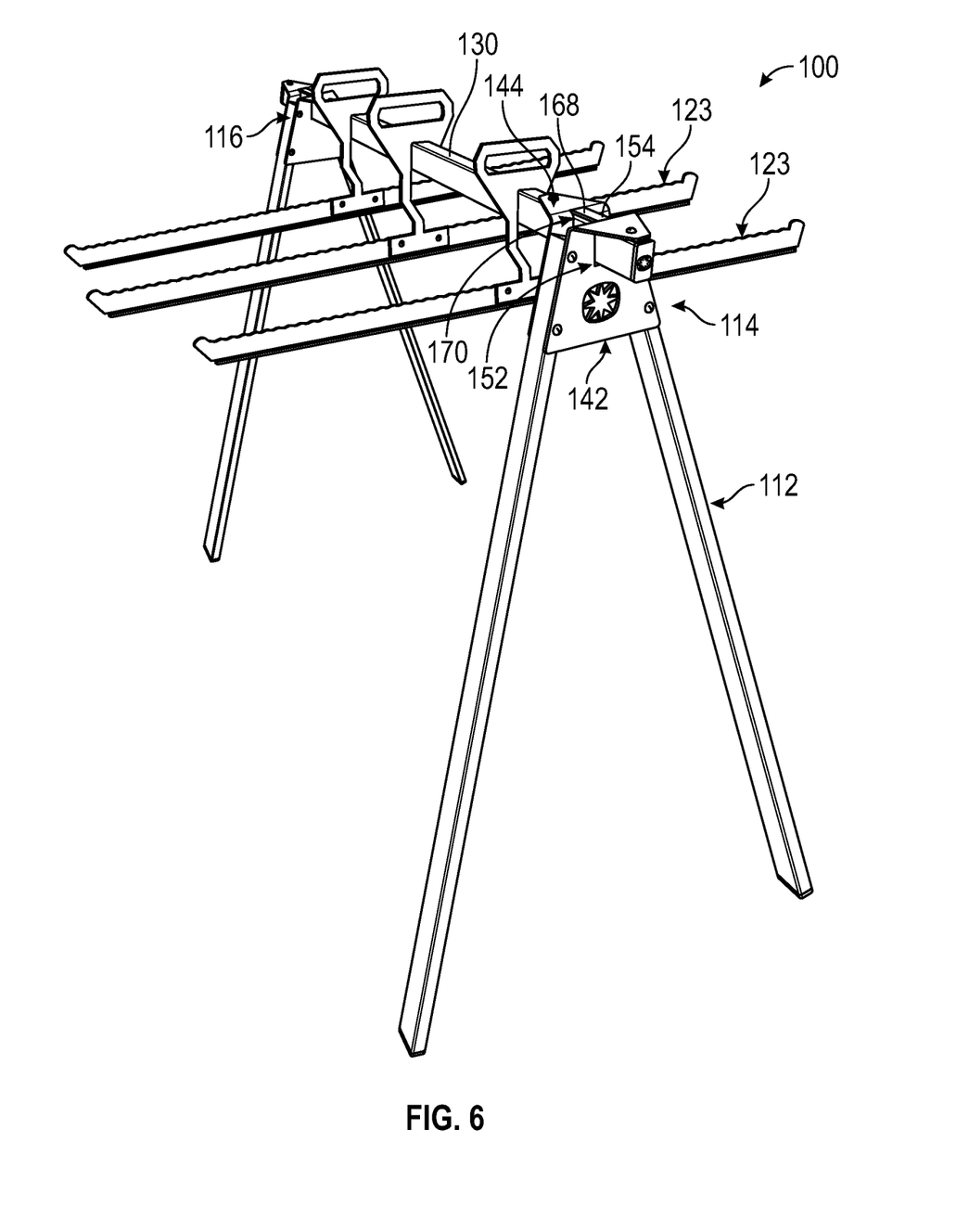
FIG. 6 is a perspective view illustrating another aspect of a vegetation hanging and drying system including a stand assembled with a pair of multi-rack bracket assemblies, a horizontal support bar, and a plurality of vegetation hangers.
Figure 7:
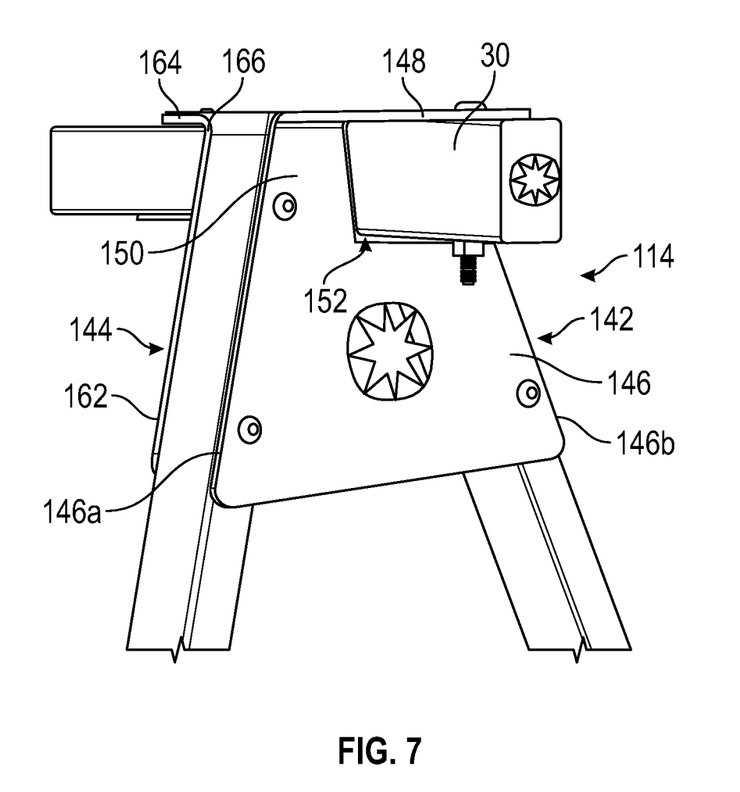
FIG. 7 is a perspective view illustrating first and second brackets of the multi-rack bracket assembly of FIG. 6 securing a leg assembly of the stand and a horizontal support bar of the stand to one another.

With reference to FIGS. 6 and 7, another type of a vegetation hanging and drying system 100 is shown for supporting vegetation hangers, such as, for example, J hangers 123. The vegetation hanging and drying system 100 is similar to and may include any of the features of the vegetation hanging and drying system 10 of FIG. 1 except as explicitly contradicted below. The vegetation hanging and drying system 100 includes a stand 112, a pair of multi-rack bracket assemblies 114, 116, and a horizontal support bar 130. Since the multi-rack bracket assemblies 114, 116 are identical or substantially similar, only the first multi-rack bracket assembly 114 will be described in detail.

The first multi-rack bracket assembly 114 includes identical first and second brackets 142, 144. The first bracket 142 generally includes a first main plate 146, an upper plate 148 extending outwardly (e.g., perpendicularly) from an upper end portion 150 of the first main plate 146, and a flange or tab 154 extending outwardly (e.g., perpendicularly) from the first main plate 146. The first main plate 146, the upper plate 148, and the tab 154 may be monolithically formed with one another from a single piece of sheet metal and bent relative to one another to form the first bracket 142 as shown. In other aspects, the first main plate 146, the upper plate 148, and the tab 154 may be attached to one another and via any suitable fastening means, such as, for example, welding, adhesive, soldering, or the like.

The first main plate 146 may have a trapezoidal shape and has a first lateral edge 146a, and an opposite second lateral edge 146b extending at an acute angle (e.g., from about 30 degrees to about 80 degrees) relative to the first lateral edge 146a. Other suitable shapes for the first main plate 146 are also contemplated. In aspects, the first and second lateral edges 146a, 146b may be at any suitable angle relative to one another. The upper end portion 150 of the first main plate 146 defines a slot 152 in a central location thereof configured for receipt of the horizontal support bar 30. The upper plate 148 may have a triangular shape and the tab 154 may have a rectangular shape. The tab 154 may be coplanar with the upper plate 148 and extend outwardly relative to the first main plate 146 in a direction opposite to the direction that the upper plate 148 extends outwardly from the first main plate 146.

The second bracket 144 of the multi-rack bracket assembly 114 includes a second main plate 162, an upper plate 164 extending outwardly (e.g., perpendicularly) from an upper end portion 166 of the second main plate 162, and a flange or tab 168 (FIG. 6) extending outwardly (e.g., perpendicularly) from the upper plate 164. The second main plate 162 may have a trapezoidal shape matching the trapezoidal shape of the first main plate 146 of the first bracket 142. Other suitable shapes for the second main plate 162 are also contemplated. The upper end portion 166 of the first main plate 162 defines a slot 170 (FIG. 6) in a central location thereof configured for receipt of the horizontal support bar 130 and to be horizontally aligned with the slot 152 of the first bracket 142. Ends of the tabs 154, 168 of the respective first and second brackets 142, 144 abut one another when assembled. In aspects, the ends of the tabs 154, 168 of the first and second bracket 142, 144 may be monolithically formed or otherwise attached to one another such that the first and second bracket 142, 144 are manufactured as one unit.

Persons skilled in the art will understand that the devices specifically described herein and illustrated in the accompanying drawings are non-limiting exemplary embodiments. It is envisioned that the elements and features illustrated or described in connection with one exemplary embodiment may be combined with the elements and features of another without departing from the scope of the disclosure. As well, one skilled in the art will appreciate further features and advantages of the disclosure based on the above-described embodiments. Accordingly, the disclosure is not to be limited by what has been particularly shown and described.

What is claimed:

1. A multi-rack bracket assembly for use in a vegetation hanging and drying system, the multi-rack bracket assembly comprising:
   a first bracket including a first main plate including an upper end portion defining at least one slot therethrough configured for receipt of at least one horizontal support bar, the first main plate having a first lateral edge, and an opposite second lateral edge extending at an acute angle relative to the first lateral edge; and a second bracket including a second main plate having a first lateral edge, and an opposite second lateral edge extending at an acute angle relative to the first lateral edge, the first and second lateral edges of the first main plate corresponding to the first and second lateral edges of the second main plate, wherein the first main plate and the second main plate are configured to capture a pair of vertical support legs therebetween.

2. The multi-rack bracket assembly according to claim 1, wherein the first bracket includes:
a first upper plate extending outwardly from the upper end portion of the first main plate; and
a first support flange extending upwardly from the first upper plate and configured to engage a first side of a vertical support bar.

3. The multi-rack bracket assembly according to claim 2, wherein the second bracket includes a second upper plate extending outwardly from an upper end portion of the second main plate, the first the upper plate of the first bracket and the second upper plate of the second bracket being configured to overlap one another to capture the at least one horizontal support bar therebetween.

4. The multi-rack bracket assembly according to claim 3, wherein the second bracket includes a second support flange extending upwardly from the second upper plate of the second bracket and configured to engage a second side of the vertical support bar.

5. The multi-rack bracket assembly according to claim 4, wherein the first upper plate of the first bracket defines an opening therethrough configured for receipt of the second support flange of the second bracket and the vertical support bar.

6. The multi-rack bracket according to claim 5, wherein the second upper plate of the second bracket defines an opening therethrough configured to receive the vertical support bar, and the second bracket includes a ledge extending outwardly from the second main plate and defining a hole configured to laterally support an end portion of the vertical support bar.

7. The multi-rack bracket assembly according to claim 2, wherein the at least one slot includes a first slot and a second slot extending in parallel relation to one another, the first and second slots configured to receive respective first and second horizontal support bars.

8. The multi-rack bracket assembly according to claim 7, wherein the first bracket further includes a pair of tabs extending from the upper end portion of the first main plate in a direction away from the first upper plate of the first bracket.

9. The multi-rack bracket assembly according to claim 8, wherein each of the pair of tabs has a hole therethrough configured to receive a fastener, and the first upper plate has a pair of holes aligned with the respective pair of holes in the pair of tabs, each of the pair of holes of the first upper plate being configured to receive a fastener.

10. The multi-rack bracket assembly according to claim 1, wherein each of the first and second main plates have a generally trapezoidal shape.

11. The multi-rack bracket assembly according to claim 1, wherein the first bracket includes an upper flange extending outwardly from the upper end portion of the first main plate, and the second bracket includes an upper flange extending outwardly from an upper end portion of the second main plate, the upper flanges extending in opposite directions from one another, wherein the upper end portion of the second main plate defines a slot therethrough configured to be aligned with the at least one slot of the first main plate.

12. A multi-rack bracket assembly for use in a vegetation hanging and drying system, the multi-rack bracket assembly comprising:
a first bracket including:
a first main plate including an upper end portion defining a first slot configured for receipt of a first horizontal support bar;
an upper plate extending outwardly from the upper end portion of the first main plate; and
a first support flange extending upwardly from the upper plate and configured to engage a first side of a vertical support bar; and
a second bracket including:
a second main plate, the first and second main plates being configured to capture a leg assembly therebetween;
an upper plate extending outwardly from an upper end portion of the second main plate, the upper plate of the first bracket and the upper plate of the second bracket being configured to overlap one another to capture the first horizontal support bar therebetween; and
a second support flange extending upwardly from the upper plate of the second bracket and configured to engage a second side of the vertical support bar to capture the vertical support bar between the first and second support flanges.

13. The multi-rack bracket assembly according to claim 12, wherein the upper plate of the first bracket defines an opening therethrough configured for receipt of the second support flange of the second bracket and the vertical support bar.

14. The multi-rack bracket according to claim 13, wherein the upper plate of the second bracket defines an opening therethrough configured to receive the vertical support bar, and the second bracket includes a ledge extending outwardly from the second main plate and defining a hole configured to laterally support an end portion of the vertical support bar.

15. The multi-rack bracket assembly according to claim 12, wherein the first bracket further includes a pair of tabs extending from the upper end portion of the first main plate in a direction away from the upper plate of the first bracket, the upper end portion of the first main plate defining a second slot extending in parallel relation to the first slot, the second slot being configured to receive a second horizontal support bar.

16. A vegetation hanging and drying system, comprising:
a harvest stand including:
first and second leg assemblies;
a first horizontal support bar configured to extend between and interconnect the first and second leg assemblies; and
first and second vertical support bars configured to extend upwardly from the respective first and second leg assemblies;
a first bracket configured to secure the first leg assembly, the first vertical support bar, and a first end portion of the first horizontal support bar to one another, the first bracket including:
a first main plate including an upper end portion defining a first slot configured for receipt of the first horizontal support bar; and an upper plate extending outwardly from the upper end portion of the first main plate; and a second bracket configured to secure the second leg assembly, a second vertical support shaft, and a second end portion of the horizontal support bar to one another, the second bracket including:

a second main plate, the first and second main plates being configured to capture the first leg assembly therebetween; and an upper plate extending outwardly from an upper end portion of the second main plate, the upper plate of the first bracket and the upper plate of the second bracket being configured to overlap one another to capture the first horizontal support bar therebetween.

17. The vegetation hanging and drying system according to claim 16, wherein the first bracket includes a first support flange extending upwardly from the upper plate thereof and configured to engage a first side of the first vertical support bar, and the second bracket includes a second support flange extending upwardly from the upper plate thereof and configured to engage a second side of the first vertical support bar.

18. The vegetation hanging and drying system according to claim 17, wherein the upper plate of the first bracket defines an opening therethrough configured for receipt of the second support flange of the second bracket and the first vertical support bar.

19. The vegetation hanging and drying system according to claim 18, wherein the upper plate of the second bracket defines an opening therethrough configured to receive the first vertical support bar, and the second bracket includes a ledge extending outwardly from the second main plate and defining a hole configured to laterally support an end portion of the first vertical support bar.

20. The vegetation hanging and drying system according to claim 19, wherein the upper end portion of the first main plate defines a second slot extending in parallel relation to the first slot, the second slot being configured to receive a second horizontal support bar, the first and second horizontal support bars being configured to couple the first and second leg assemblies to one another, the second support flange being configured to extend between the first and second horizontal support bars.

* * * * *